United States Patent

[11] 3,625,962

| [72] | Inventors | Franco De Marchi;<br>Gianfranco Tamagnone, both of Turin, Italy |
|---|---|---|
| [21] | Appl. No. | 727,357 |
| [22] | Filed | May 7, 1968 |
| [45] | Patented | Dec. 7, 1971 |
| [73] | Assignee | Stabilimenti Chimici Farmaceutici Riuniti Schiapparelli S.p.A.<br>Turin, Italy |
| [32] | Priority | May 15, 1967 |
| [33] | | Italy |
| [31] | | 51724-A/67 |

[54] BENZODIAZEPINE COMPOUND
1 Claim, No Drawings

[52] U.S. Cl. .................................................. 260/239.3 D, 424/244
[51] Int. Cl. ..................................................... C07d 53/06
[50] Field of Search ........................................ 260/239.3 BD

[56] References Cited
UNITED STATES PATENTS

| 3,321,469 | 5/1967 | Walkenstein ................ | 260/239.3 |
| 3,445,458 | 5/1969 | Bell ............................. | 260/239.3 |

OTHER REFERENCES

Graziani et al., " Bolletino Societa Italiana di Biologics Sperimentale," Vol. 43, No. 21, (Nov. 1967) pp. 1422– 6
Chemical Abstracts, Vol. 68 (1968) 48154 j abstracting Graziani et al., " Boll. Soc. Ital. Biol. Sper.," Vol. 43, No. 21, pp. 1422– 6 (1967)

*Primary Examiner*—Henry R. Jiles
*Assistant Examiner*—Robert T. Bond
*Attorney*—Sughrue, Rothwell, Mion, Zinn & Macpeak ABSTRACT: A therapeutically effective diazepine compound consisting of 7-chloro-1,3-dihydro-3-hemisuccinyloxy-5-phenyl-2H-1,4-benzodiazepine-2-one dimethylaminoethanol salt which compound is particularly effective for the treatment of anxiety in convulsive syndroms of any origin, even in the presence of depressive symptoms, and for eliminating tension and spasms of the skeletal muscular system.

BENZODIAZEPINE COMPOUND

This invention relates to a novel, therapeutically effective organic salt; more particularly, the invention relates to 7-chloro-1,3-dihydro-3-hemisuccinyloxy-5-phenyl-2H-1,4-benzodiazepine-2-one dimethylaminoethanol salt (hereinafter also briefly denoted as "SAS 546") corresponding to the structural formula:

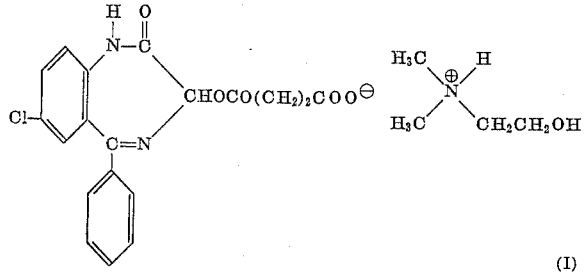

French Pat. No. M 3314 (to the disclosure of which a specific reference is made herein) discloses sodium salt of 7-chloro-1,3-dihydro-3-hemisuccinyloxy-5-phenyl-2H-1,4-benzodiazepine-2-one, to which sedative, anticonvulsant and muscle-relaxant properties are attributed.

We have now discovered that the dimethylaminoethanol salt (I) according to this invention is at least as sedative, anticonvulsant and muscle-relaxant as the sodium salt just mentioned above, while being at the same time surprisingly less toxic and substantially deprived of CNS-depressant effects ("CNS" stands herein for Central Nervous System).

Moreover, as compared with the sodium salt, the dimethylaminoethanol salt (I) is over 15 times more soluble in water; actually, its solubility at 20° C. is 253 g/liter.

Thus, from the pharmacological standpoint, the dimethylaminoethanol salt (I) is highly useful in that: (a) its administration does not involve undesired CNS-depressant effects, so that the salt may be administered even to depressed patients not tolerating conventional benzodiazepine pharmaceuticals; (b) its reduced toxicity and increased water-solubility lead to rapid absorption, high haematic levels, early therapeutical effects and substantially reduced danger of intoxication. The administration of the salt (I) is, therefore, particularly indicated for treatment of anxiety and convulsive syndromes of any origin, even in the presence of depressive symptoms, and for eliminating tension/and spasms of the skeletal muscular system.

The salt of formula (I) according to the invention is obtained by reacting the 7-chloro-1,3-dihydro-3-hemisuccinyloxy-5-phenyl-2H-1,4-benzodiazepine-2-one with dimethylaminoethanol.

The salification reaction is generally carried out in the presence of an inert organic solvent, such as acetone, methanol, ethanol, at temperatures ranging from −10° C. to +40° C.; the resulting salt separates spontaneously from the reaction mixture in a crystalline form or can be precipitated therefrom by dilution with a suitable solvent such as ethyl ether, hexane, petroleum ether and, possibly, cooling to a temperature between 0° C. and −40° C.

The salt of formula (I) thus obtained does not as a rule require further purification. The yield of the salification reaction is usually about 90 percent.

The salt of formula (I) is a white crystalline hygroscopic powder having melting point of 117°–118° C. It is highly water-soluble (by over 25 percent at room temperature) giving a neutral solution. It is moreover easily soluble in methanol and ethanol; it dissolves in boiling acetone and is practically insoluble in ether. Its degree of purity may be determined by either a potentiometric titration or by U.V.-spectrophotometry at which it exhibits a maximum of absorption at 230 m$\mu$.

The salt of formula (I) is stable in dry state and can be perfectly preserved by lyophilization (freeze-drying) as such or on a suitable support such as mannitol or glycine. In this form it may be easily dissolved on use in apyrogenous water and administered either parenterally or intravenously, as distinct from other benzodiazepine pharmaceuticals (Chlordiazepoxide, Diazepam, Oxazepam), which are water-insoluble and require solvents not deprived of certain toxicity, such as mixtures of propyleneglycol and ethanol. The range of doses which is generally suitable for human use is of 10 to 100 mg. daily by intramuscular or endovenous administration. Typical preparations comprise sealed vials containing doses of 12.5 mg., 25 mg. and 50 mg. of the salt (I) in lyophilized condition. The minimum dose recommended is 10 mg.

The following examples are given by way of illustration of the invention, but should not be understood as a limitation thereof.

EXAMPLE 1

7-Chloro-1,3-dihydro-3-hemisuccinyloxy-5-phenyl-2H-1,4-benzodiazepine-2-one dimethylaminoethanol salt.

A solution of 7-chloro-1,3-dihydro-3-hemisuccinyloxy-5-phenyl-2H-1,4-benzodiazepine-2-one (30 g., 0.077 moles) in absolute ethanol (200 ml.) preheated at 30° C. and contained in a flask provided with a stirrer and protected against atmospheric moisture by a calcium chloride trap is admixed while stirring with a solution of 2N dimethylaminoethanol (38.5 ml.; 0.077 moles) in absolute ethanol. Upon completing addition the mixture is further stirred during 15 minutes, then cooled to −15°/−20° C. The cold reaction mixture is then slowly additioned with ether in an amount (600–800 ml.) producing a persistent clouding, a precipitate being obtained by further cooling. The solid is filtered, washed with cool acetone (3×100 ml.) then dried in vacuum (3 mm. Hg-column) at room temperature during 24 hours in the presence of a dehydrating agent (e.g. sulfuric acid), whereby 33 g. (90 percent of theory) of product of a melting point 177°–118° C. are obtained.

$\epsilon^{cm.}_{230\ m\mu} = 40.10^6$. Potentiometric titre (HCl 0.01N) > 99%.

Analysis
for $C_{23}H_{26}ClN_3O_6$:
found % : C 57.94; H 5.68; N 8.68; Cl 7.37
calculated : 58.05; 5.51; 8.83; 7.45

Thin Layer Chromatography

Layer: Silcagel G Merck; amount applied: 0.1 mg. in 1 percent methanol solution;
Solvent: Chloroform/Methanol/Acetic Acid (12:1:0.1); Detection: 20 percent $H_2SO_4$ in methanol
Single Spot with Rf=0.55.

EXAMPLE 2

Pharmaceutical preparation based on 7-chloro-1,3-dihydro-3-hemisuccinyloxy-5-phenyl-2H-1,4-benzodiazepine-2-one-dimethylaminoethanol salt.

Twenty-five grams 7-chloro-1,3-dihydro-3-hemisuccinyloxy-5-phenyl-2H-1,4-benzodiazepine-2-one dimethylaminoethanol salt and 25 g. mannitol (or glycine) are dissolved in 1000 ml. apyrogenous water. The resulting solution is uniformly subdivided into 1,000 vials of dark glass in which it is lyophilized at 0° C./0.1 mm. Hg-column after freezing to −40° C. Drying is completed within 8 hours (water residue less than 1 percent); the dried product is in the form of a uniform white mass, each vial containing 25 mg. salt (I) and 25 mg. mannitol (or glycine). The mass can be readily redissolved on use in 0.5–1 ml. apyrogenous water.

PHARMACOLOGICAL PROPERTIES (The data given in this section have been disclosed in part by G. Graziani and F. De Marchi in Boll. Soc. Ital. Biol. Sper., 43, 1422 (1967)):

Acute Toxicity

The acute toxicity was investigated on the Wistar rat (10 animals to each tested dose); the $LD_{50}$ and its 95 percent confidential limits were calculated by Weil's method (Biometrics, 8, 249; 1952). The $LD_{50}$ of the salt of formula (I) is 592 mg./kg. (539–649 mg./kg.) by intraperitoneal administration and exceeds 3 g./kg. by oral administration. The similarily evaluated (for comparison purposes) $LD_{50}$-value of the sodium salt resulted to amount to 420 mg./kg. (383–485 mg./kg. intraperitoneal and to 2,250 mg./Kg. (1965–2581 mg./kg.) by oral administration. The 7-chloro-1,3-dihydro-3-hemisuccinyloxy-5-phenyl-2H-1,4-benzodiazepine-2-one dimethylaminoethanol salt is therefore significantly less toxic than its homologous sodium salt with both ways of administration adopted.

Anticonvulsant Activity

This was investigated by administering the salt (I) intraperitoneally to Wistar rats (10 animals to each tested dose) in association with pentylenetetrazol (64 mg./kg. i.p.) and strychnine (4 mg./kg. i.p.).

The respective $ED_{50}$-values and 95 percent confidential limits were calculated by Weil's method (mentioned hereinbefore). The compound (I) exerts a considerable antagonizing action towards pentylenetetrazol:

$ED_{50}$ is 5.02 mg./kg. (3.78–6.64 mg./kg.); it is further effective against convulsions from strychnine with an $ED_{50}$ of 48.3 mg./kg. (33.8–69.0 mg./kg.).

Sedative Action

The salt (I) was associated with caffeine, a typical CNS-stimulant by adopting the "open field" technique (N. Montanaro and Coll., Riv. Sperim. Freniatria, 87, 877; 1963). Eight groups of 15 male Wistar rats each were treated as follows by intraperitoneal administration:

physiological solution
caffeine 50 mg./kg.
SAS 546 12.5 mg./kg.
SAS 546 25 mg./kg.
SAS 546 50 mg./kg.
SAS 546 12.5 mg./kg. + caffeine 50 mg./kg. (after 30 min.)
SAS 546 25 mg./kg. + caffeine 50 mg./kg. (after 30 min.)
SAS 546 50 mg./kg. + caffeine 50 mg./kg. (after 30 min.)

The animals were individually observed during a 5 minutes period following the administration. The significance of the experimental factors has been tested by means of the analysis of variance: log-transformation was used to obtain the variance homogenity.

The results obtained are summarized in the following tables:

TABLE 1

Influence of caffeine and SAS 546 on the crossing in the "open field" test. Analysis of variance of the $X+0.5$ transformed experimental data

| Source of variation | D.F. | Deviance | Variance | F |
|---|---|---|---|---|
| Caffeine | 1 | 21.85158 | 21.85158 | 12.16* |
| SAS 546 | 3 | 71.91506 | 23.97169 | 13.34* 69 |
| Interaction | 3 | 64.16039 | 21.38680 | 11.91* |
| Error | 112 | 201.18311 | 1.79628 | |
| SAS 546/Controls | 3 | 102.21470 | 34.07157 | 18.97* |
| SAS 546/Caffeine | 3 | 33.86078 | 11.28693 | 6.28* |
| Total | 119 | 359.11013 | | |

*P<0.01

TABLE 2

INfluence of caffeine and SAS 546 on the balancing in the "open field" test. Analysis of variance of the $x+0.5$ transformed experimental data.

| Source of variation | D.F. | 11 Deviance | Variance | F |
|---|---|---|---|---|
| Caffeine | 1 | 0.094515 | 11 0.09415 | 1 |
| SAS 546 | 3 | 37.75223 | 12.58408 | 32.16* |
| Interaction | 3 | 5.18258 | 1.72753 | 4.41* |
| Error | 112 | 43.82518 | 0.39130 | |
| SAS 546/Controls | 3 | 29.75981 | 9.91994 | 25.35* |
| SAS 546/Caffeine | 3 | 13.17501 | 4.39167 | 11.22* |
| Total | 11 119 | 86,85414 | | |

*P<0.01

The data obtained show that SAS 546 is effective against central excitation induced by caffeine, more particularly in respect of the investigating activity, expressed by "balancing" of the animal. The decomposition of the interaction shows a high significance of SAS 546 in respect of both the controls and treated subjects. The modification of the particular type of motility investigated denotes a thalamic level action of SAS 546, in that depression of the balancing motility and increment in crossing motility indicate a blockage of the anxiety-generating mechanisms which typically break loose when an animal is subjected to the action of a central excitant and placed into a novel situation implying ipso facto an inner conflict.

Muscle-relaxant Activity

This was evaluated by the conventional "head-drop" test on rabbits. The salt (I) was administered by slow endovenous infusion to four groups of five rabbits each treated with doses of 75, 108, 155, 225 mg./kg. The administration results in the animal in a characteristic symptomatology: at first, the head drops by a barely perceptible extent because of the animal's efforts to oppose drop by all its forces, then it suddenly drops as the muscular hypotonia prevails over the animal's will. The $ED_{50}$ of the salt (I) and its 95 percent confidential limits (calculated by Weil's method mentioned herein before found in this test are 114.8 mg./kg. (75.3–175.3 mg./kg.).

Action on Spontaneous Motility

This investigation was carried out on four groups of 20 Swiss mice each, treated 30 minutes before the experiment with 6, 12, 25, 50 mg./kg. respectively, of the salt (I) by intraperitoneal administration. The spontaneous motility of the animals was recorded after 90, 300, 600 seconds by an equipment comprising six photoelectric cells equidistantly distributed over a circular enclosure. The results were compared with the results obtained with 50 mg./kg. sodium salt by intraperitoneal administration, as summarized in the following table.

TABLE 3

| | Dimethylaminoethanol salt (I), mg./kg. | | | | Sodium salt, 50 mg./kg. |
|---|---|---|---|---|---|
| | 6 | 12 | 25 | 50 | |
| Recording periods in seconds | Variation in motility with respect to the controls, percent | | | | |
| 90 | +15 | +10 | −15 | −12 | −40 |
| 300 | +20 | +5 | −13 | −13 | −40 |
| 600 | +25 | +7 | −10 | −15 | −42 |

At low doses (6–12 mg./kg.) the salt (I) increases the motility of rats; a limited reduction, by a maximum of 15 percent, occurs with 25 and 50 mg./kg. Conversely, the sodium salt evidences at 50 mg./kg. a reduction in motility by about 40 percent. This shows a negligible CNS-depressant action by the salt (I) at high doses, whereas with smaller doses, which are much more comparable with therapeutical doses, a CNS-stimulating activity is even ascertained; this feature substantially distinguishes the salt (I) from the sodium salt which conspicuously depresses the spontaneous motility of the animal, its action being thus CNS-depressant.

ABSORPTION

Investigations tending to ascertain the hematic levels following the intraperitoneal administration in the Wistar rat by the dimethylaminoethanol salt (I) and, by way of comparison, of the sodium salt were effected by employing colorimetric methods (S. S. Walkenstein & Coll., J. Pharm. Sci., 53, 1181; 1964). The results obtained with the salt (I) showed plasmatic amounts thereof higher than those obtained with a similar dose of the sodium salt; 30 minutes after administration it was namely possible to detect with the salt (I) a concentration in plasma exceeding by about 40 percent the concentration upon administration of the sodium salt.

THERAPEUTICAL APPLICATIONS

A clinical investigation on human patients was carried out with the pharmaceutical preparation according to example 2, in the form of lyophilized vials each containing 25 mg. 7-chloro-1,3-dihydro-3hemisuccinyloxy-5-phenyl-2H-1,4-benzodiazepine- 2-one-dimethylaminoethanol salt as active substance. For use, the substance was dissolved in 1 ml. apyrogenous water. The preparation was utilized above all in treating anxiety and convulsive syndromes of a psychoneurotic origin or accompanying more severe psychosis even in the presence of depressive states. Examples among the various patients treated are given hereafter.

CASE No. 1

A. L., male, aged 40, code No. 19, diagnosis of psychoneurosis with sinus tachycardia. With this patient, who suffered from an anxious psychoneurosis of old date, and whose disturbances had recently again become acute, affecting more particularly the cardiovascular region, the intramuscular administration of 1 vial a day of the salt (I) lead to a marked improvement of the subjective symptoms and disappearance of the disturbances residing in anxiety, restlessness, sleep disorder, cardiopalmus. The therapy was continued for 28 days, at the lapse of which the patient had clinically recovered. During this therapy no depressive effects by the medicine on the central nervous system were ascertained: the patient was sedated but never depressed. Control, clinical and laboratory tests were further carried out in respect of the hemopoietic and cardiovascular system, the renal and the hepatic functions, without ascertaining any departure from normal conditions.

CASE No. 2

R. P., male, aged 24, code No. 33, diagnosis of schizophrenia with a marked motorial restlessness. On hospitalization the patient exhibited a severe crisis on acute anxiety jointly with auditory hallucinations and motorial restlessness. He was treated with 50 mg. salt (I) by intramuscular administration with a remarkable result: the patient was appeased and was able to rest. Twenty-four hours later the patient again exhibited acute anxiety and psychomotorial restlessness with tactile and visual hallucinations (small animals on the cutis). In this case again 50 mg. of salt (I) were administered by intramuscular administrations, which resulted in remission of the anxiety and motorial hyperactivity.

CASE No. 3

A.M.G., female, aged 54, code number 34, diagnosis of maniac depressive psychosis with extrapyramidal syndrome from pharmacological impregnation. On hospitalization the patient exhibited a massive state of anxiety and has been treated with an endovenous dose of 50 mg. of salt (I) which distinctly tranquillized her and markedly reduced muscular stiffness; the medicine proved effective against the symptom of anxiety and muscular spastic rigidity due to a previous neuroleptic treatment.

CASE NO. 4

L.F., female, aged 67, code No. 37, diagnosis of a confusional state. On hospitalization the patient was in a confusional state and was additionally very anxious and restless, so that she was treated with 100 mg. of salt (I) by intramuscular administration. In this case the effectiveness of the preparation against anxiety was displayed in full, as it succeeded in thoroughly dominating the massive expanding anxiety of the patient. The large dose administered further evidenced the absence of a depressive action of the medicine and its tolerance, for no side-effect was ascertained.

CASE No. 5

D. A., female, aged 22, code No. 21, diagnosis of anxious neurosis with somatic symptoms. The patient suffered from a serious anxious neurosis as well as incohercible vomit and gastralgia. She was treated with the salt (I) at a dose of 50 mg. daily (1 vial endovenous plus 1 vial intramuscular) during 6 days. After 2 days from the beginning of the therapy the vomit and gastralgia disappeared and the anxious symptomatology markedly decreased; after 4 days the patient had clinically recovered and could be dismissed. No secondary effects or depressive symptoms were noted.

What we claim is:

1. the dimethylaminoethanol salt of 7-chloro-1,3-dihydro-3-hemisuccinyloxy-5-phenyl-2H-1,4-benzodiazepine-2-one corresponding to the formula:

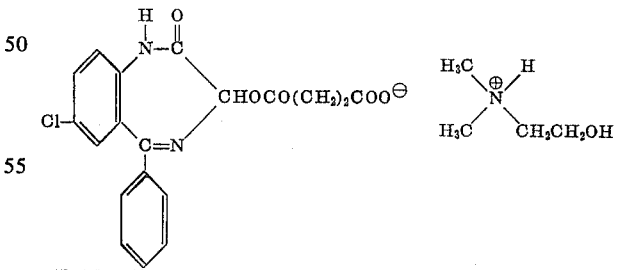

* * * * *